US008693406B2

(12) United States Patent
Ahmadi et al.

(10) Patent No.: US 8,693,406 B2
(45) Date of Patent: Apr. 8, 2014

(54) MULTI-USER RESOURCE ALLOCATION AND MEDIUM ACCESS CONTROL (MAC) OVERHEAD REDUCTION FOR MOBILE WORLDWIDE INTEROPERABILITY FOR MICROWAVE ACCESS (WIMAX) SYSTEMS

(75) Inventors: Sassan Ahmadi, Portland, OR (US); Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 11/836,495

(22) Filed: Aug. 9, 2007

(65) Prior Publication Data
US 2009/0040970 A1    Feb. 12, 2009

(51) Int. Cl.
*H04W 4/00* (2009.01)

(52) U.S. Cl.
USPC .......................................... 370/329; 370/473

(58) Field of Classification Search
USPC ......... 370/328, 329, 338, 389, 392, 473, 474, 370/477
See application file for complete search history.

(56) References Cited

U.S. PATENT DOCUMENTS

| 5,936,967 | A | 8/1999 | Baldwin et al. |
| 7,151,754 | B1* | 12/2006 | Boyce et al. ................... 370/328 |
| 7,499,426 | B2* | 3/2009 | Venkatachalam ............. 370/329 |
| 7,590,118 | B2* | 9/2009 | Giesberts et al. ............. 370/392 |
| 7,599,317 | B2* | 10/2009 | Schaap ......................... 370/310 |
| 2002/0191691 | A1 | 12/2002 | Holborow |
| 2004/0258092 | A1 | 12/2004 | Sugaya |
| 2005/0201269 | A1* | 9/2005 | Shim et al. .................... 370/208 |
| 2005/0249222 | A1* | 11/2005 | van Kampen et al. ..... 370/395.5 |
| 2005/0286451 | A1 | 12/2005 | Kim et al. |
| 2006/0156198 | A1 | 7/2006 | Boyce et al. |
| 2006/0218298 | A1* | 9/2006 | Knapp et al. .................. 709/238 |
| 2007/0060149 | A1* | 3/2007 | Lim et al. ...................... 455/445 |
| 2007/0086474 | A1* | 4/2007 | Lee et al. ....................... 370/447 |
| 2007/0097945 | A1* | 5/2007 | Wang et al. ................... 370/349 |
| 2007/0098007 | A1 | 5/2007 | Prodan et al. |
| 2007/0201468 | A1 | 8/2007 | Jokela |
| 2008/0069148 | A1 | 3/2008 | Wu |
| 2008/0123620 | A1 | 5/2008 | Ko et al. |

(Continued)

FOREIGN PATENT DOCUMENTS

WO    2009/023485 A1    2/2009

OTHER PUBLICATIONS

Office Action received for United Kingdom Patent Application No. 1002361.2, mailed on Nov. 23, 2011, 3 pages.

(Continued)

*Primary Examiner* — Ricky Ngo
*Assistant Examiner* — Christine Ng
(74) *Attorney, Agent, or Firm* — Kacvinsky Daisak Bluni PLLC (57) ABSTRACT

Various embodiments are directed to multi-user resource allocation capable of significantly reducing MAC header overhead and scheduling delay for small payload applications, such as Voice over Internet Protocol (VoIP) and interactive gaming and to increase the capacity of such applications. In various implementations, multi-user resource allocation may be used in mobile Worldwide Interoperability for Microwave Access (WiMAX) systems designed to operate in accordance with the Institute for Electronic and Electrical Engineers (IEEE) standards such as the 802.16e-2005 standard and/or the evolving IEEE 802.16m standard as well as Third Generation Partnership Project (3GPP), 3GPP Long Term Evolution (LTE), and/or 3GPP2 Ultra Mobile Broadband (UMB) standards.

16 Claims, 6 Drawing Sheets

(56) References Cited

U.S. PATENT DOCUMENTS

| | | | |
|---|---|---|---|
| 2008/0285501 A1 | 11/2008 | Zhang et al. | |
| 2009/0003467 A1* | 1/2009 | Chen | 375/260 |
| 2009/0010243 A1 | 1/2009 | Hiddink | |
| 2009/0022178 A1* | 1/2009 | Ji et al. | 370/470 |
| 2009/0080351 A1 | 3/2009 | Ryu et al. | |

OTHER PUBLICATIONS

International Search Report and Written Opinion received PCT Application No. PCT/US2008/072275, mailed on Jan. 23, 2009, 13 pages.

Office Action received for Chinese Patent Application No. 200880102079.1, mailed Jan. 30, 2013, 22 pages including 13 pages English translation.

Srinivasan et al., "IEEE 80216m System Description Document (SDD)", IEEE 802.16m-09/0034r2, Sep. 24, 2009, 163 pages.

IEEE 802.16e, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Feb. 28, 2006, (author unknown).

* cited by examiner

Group of Users with Common CID_MSB (Truncation of CID)

FIG. 4B

(Splitting of CID into User_ID and User-Connection-ID)

MULTI-USER RESOURCE ALLOCATION AND MEDIUM ACCESS CONTROL (MAC) OVERHEAD REDUCTION FOR MOBILE WORLDWIDE INTEROPERABILITY FOR MICROWAVE ACCESS (WIMAX) SYSTEMS

RELATED APPLICATIONS

This application is related to co-pending U.S. patent application Ser. No. 11/831,299, titled COMPRESSED MEDIUM ACCESS CONTROL (MAC) HEADER STRUCTURE FOR MAC OVERHEAD REDUCTION IN MOBILE WORLDWIDE INTEROPERABILITY FOR MICROWAVE ACCESS (WiMAX) SYSTEMS, which was filed on Jul. 31, 2007 and is incorporated by reference.

BACKGROUND

Mobile Worldwide Interoperability for Microwave Access (WiMAX) is a broadband wireless technology for fixed and mobile broadband networks to enable broadband data services including data, streaming video, and voice. Mobile WiMAX systems may operate in accordance with standards such as the Institute for Electronic and Electrical Engineers (IEEE) 802.16e-2005 standard, "Air Interface for Fixed and Mobile Broadband Wireless Access Systems," (February, 2005) and the evolving IEEE 802.16m standard, "Advanced Air Interface."

The medium access control (MAC) layer of IEEE 802.16e-2005 was originally inherited from Data Over Cable Service Interface Specification (DOCSIS) standard. For IEEE 802.16e-2005 and mobile WiMAX, each MAC Protocol Data Unit (PDU) includes a Generic MAC header followed by a payload or Service Data Unit (SDU) and a Cyclic Redundancy Check (CRC). The CRC is 4 octets and is based on IEEE 802.3 and calculated on the entire MAC PDU including the MAC header and the payload.

The Generic MAC Header (GMH) and the Bandwidth Request (BW-REQ) header are two types of MAC headers. As defined in IEEE 802.16e-2005, the size of the GMH is 6 octets: Header Type (HT) (1 bit), Encryption Control (EC) (1 bit), Payload Type (6 bits), Reserved (Rsv) (1 bit), CRC indicator (CI) (1 bit), Encryption Key Sequence (EKS) (2 bits), Rsv (1 bit), Payload Length most significant bits (LEN MSB) (3 bits), Payload Length least significant bits (LEN LSB) (8 bits), Connection Identifier most significant bits (CID MSB) (8 bits), Connection Identifier least significant bits (CID LSB) (8 bits), and Header Check Sequence (HCS) (8 bits). The size of the BW-REQ header also is 6 octets: HT (1 bit), EC (1 bit), Bandwidth Request Type (3 bits), Bandwidth Request most significant bits (BR MSB) (11 bits), Bandwidth Request least significant bits (BR LSB) (8 bits), CID MSB (8 bits), CID LSB (8 bits), and (HCS) (8 bits).

The size of MAC headers is a significant overhead for certain applications such as Voice over Internet Protocol (VoIP) and interactive gaming, which are both delay sensitive and typically include frequent small payloads. Depending on the type of voice codec employed, such as the Adaptive Multi-Rate (AMR) codec as an example, the size of VoIP Real-time Transport Protocol (RTP) payloads are typically less than 40 octets (e.g., 20 octets for ITU-T G.729). Therefore, a VoIP packet encapsulated in a MAC PDU may have between 25% to 50% overhead due to the size of the MAC header and the trailing CRC. Furthermore, in VoIP and interactive gaming applications, most of the fields in the conventional MAC header usually are not used to the full extent.

The IEEE 802.16e-2005 standard was designed for data applications and with maximal flexibility. Nevertheless, the increasing demand from cellular operators for increased VoIP capacity and the emergence of new applications such as interactive gaming require MAC overhead reduction techniques and more efficient alternatives to the conventional MAC header.

DETAILED DESCRIPTION

Various embodiments are directed to multi-user resource allocation capable of significantly reducing MAC header overhead and scheduling delay for small payload applications, such as VoIP and interactive gaming, and thereby to increase the capacity of such applications. In various implementations, multi-user resource allocation may be used in mobile WiMAX systems designed to operate in accordance with the IEEE 802.16e-2005 standard, the evolving IEEE 802.16m standard, as well as Third Generation Partnership Project (3GPP), 3GPP Long Term Evolution (LTE), and/or 3GPP2 Ultra Mobile Broadband (UMB) standards.

It can be appreciated that while exemplary embodiments may be described in the context of mobile WiMAX systems and/or particular standards for purposes of illustration, the aspects and advantages described herein may be applicable to improve other wireless communications systems and standards in accordance with the described embodiments. For example, some embodiments may be compatible with devices and/or networks operating in accordance with existing IEEE 802.11, 802.11a, 802.11b, 802.11e, 802.11g, 802.11h, 802.11i, 802.11n, 802.16, 802.16d, 802.16e standards as well as future versions, derivatives, or the evolution of the above standards.

Figure 1:
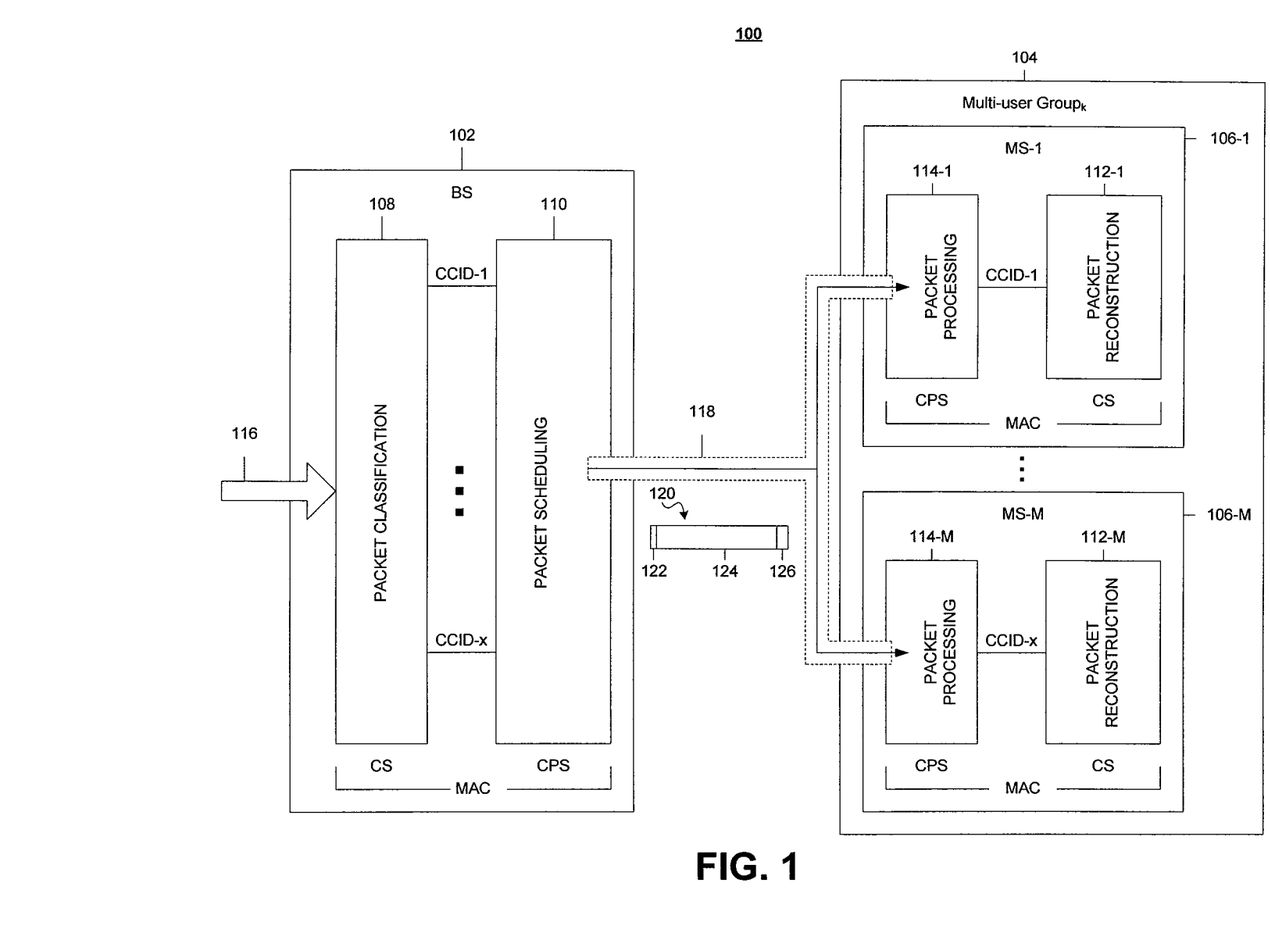
FIG. 1 illustrates a WiMAX system in accordance with various embodiments.

FIG. 1 illustrates one embodiment of a mobile WiMAX system 100. In various embodiments, mobile WiMAX system 100 may operate in accordance with the IEEE 802.16e-2005 standard, the evolving IEEE 802.16m standard, as well as 3GPP LTE, and/or 3GPP2 UMB standards or their evolutions. The embodiments, however, are not limited in this context.

Mobile WiMAX system 100 may support various communication and/or modulation techniques such as Frequency Division Multiplexing (FDM), Orthogonal FDM (OFDM), Orthogonal Frequency Division Multiple Access (OFDMA), Scalable OFDMA (S-OFDMA), Coded OFDM (COFDM), Time Division Multiplexing (TDM), Time Division Multiple Access (TDMA), Extended TDMA (E-TDMA), Time-Division Duplex (TDD), Frequency Division Duplex (FDD), Quadrature Phase Shift Keying (QPSK), Offset QPSK (OQPSK), Differential QPSK (DQPSK), Quadrature Amplitude Modulation (QAM), N-state QAM (N-QAM), Differential QAM (DQAM), and others.

Mobile WiMAX system 100 may employ various coding techniques such as CRC, Forward Error Correction (FEC), CRC, Automatic Repeat Request (ARQ), Hybrid ARQ (HARQ), Fast Channel Feedback, Convolution Code (CC), Convolution Turbo Code (CTC), Block Turbo Code, Low Density Parity Code Check (LDPC), and others.

Mobile WiMAX system 100 may support various encryption techniques such as Advanced Encryption Standard (AES) encryption, Advanced Access Content System (AACS) encryption, Data Encryption Standard (DES) encryption, Triple DES (3DES) encryption, Rivest, Shamir, and Adleman (RSA) encryption, Elliptic curve cryptography (ECC) encryption, and others.

Mobile WiMAX system 100 may utilize various antenna techniques such as Multiple Input Multiple Output (MIMO), Adaptive MIMO (A-MIMO), Single Input Multiple Output (SIMO), Multiple Input Single Output (MISO), Adaptive or Advanced Antenna System (AAS), and/or other intelligent or multiple antenna technology.

Mobile WiMAX system 100 may provide voice and/or data communications functionality in accordance with different types of systems such as Code Division Multiple Access (CDMA) systems, Global System for Mobile Communication (GSM) systems, North American Digital Cellular (NADC) systems, OFDMA systems, TDMA systems, E-TDMA systems, Narrowband Advanced Mobile Phone Service (NAMPS) systems, 3G systems such as Wide-band CDMA (WCDMA), CDMA-2000, and Universal Mobile Telephone System (UMTS) systems, GSM with GPRS systems (GSM/GPRS), CDMA/1xRTT systems, Enhanced Data Rates for Global Evolution (EDGE) systems, EV-DO systems, Evolution For Data and Voice (EV-DV) systems, High Speed Downlink Packet Access (HSDPA) systems, High Speed Uplink Packet Access (HSUPA) systems, Multi-Carrier Modulation (MDM) systems, Discrete Multi-Tone (DMT) system, Bluetooth® system, ZigBee™ system, and others.

Mobile WiMAX system 100 may communicate, manage, or process information in accordance with one or more protocols such as MAC protocol, Physical Layer (PHY) protocol, Physical Layer Convergence Protocol (PLCP), Dynamic Host Configuration Protocol (DHCP), File Transfer Protocol (FTP), Trivial FTP (TFTP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), Multipurpose Internet Mail Extensions (MIME) protocol, Gateway Control Protocol, Media Gateway Control Protocol (MGCP), Simple Gateway Control Protocol (SGCP), Session Announcement Protocol (SAP), Session Description Protocol (SDP), Session Initiation Protocol (SIP), Remote Voice Protocol (RVP), RVP Control Protocol (RVPCP), Real Time Streaming Protocol (RTSP), Real-time Transport Protocol (RTP), Synchronized Multimedia Integration Language (SMIL) protocol, Internet Streaming Media Alliance (ISMA) protocol, and others.

Mobile WiMAX system 100 may operate in accordance with various Quality of Service (QoS) levels and/or parameters. Examples of QoS levels may include unsolicited grant service (UGS), real-time polling service (rtPS), extended rtPS (ErtPS), non-real-time polling service (nrtPS), and best effort (BE) service flow. UGS may specify maximum sustained rate, maximum latency tolerance, and jitter tolerance for applications such as VoIP and interactive gaming. rtPS may specify minimum reserved rate, maximum sustained rate, maximum latency tolerance, and traffic priority for applications such as streaming audio and video. ErtPS may specify minimum reserved rate, maximum sustained rate, maximum latency tolerance, traffic priority and jitter tolerance for applications such as VoIP including voice with activity detection. nrtPS may specify minimum reserved rate, maximum sustained rate, and traffic priority for FTP applications. BE service flows may specify maximum sustained rate and traffic priority for applications such as e-mail, web browsing, and data transfer.

As shown, mobile WiMAX system 100 may comprise a base station (BS) 102 coupled to a multi-user group 104 of mobile stations including one or more of mobile station (MS) 106-1 to MS 106-M, where M represents any positive integer in accordance with the described embodiments. In an exemplary embodiment, the maximum number of mobile stations for multi-user group 104 may be set to 8 either as part of system configuration information or standard specification to ensure sufficient error protection for multi-user packets. It can be appreciated, however, that other values for M and/or the maximum number of mobile stations may be utilized for a particular implementation depending on deployment and network operating conditions.

BS 102 and MS 106-1-M each may be implemented as hardware, software, or any combination thereof, as desired for a given set of design parameters or performance constraints. BS 102 may comprise or be implemented as a wireless device or system such as a WiMAX base station, relay station (RS), mobile multihop relay BS (MMR-BS), network hub, gateway, router, and so forth. Each of MS 106-1-M may comprise or be implemented as wireless device or system such as a wireless client device, user terminal, laptop computer, portable computer, personal computer (PC), notebook PC, handheld computer, server computer, personal digital assistant (PDA), cellular telephone, combination cellular telephone/PDA, VoIP telephone, smart phone, pager, messaging device, media player, digital music player, game device, set-top box (STB), appliance, customer premises equipment (CPE), wireless access point (AP), a modem, Global Positioning System (GPS) device, Location Based Services (LBS) device, navigation system, and others.

In general, a wireless device may comprise one more wireless interfaces and/or components for wireless communication such as one or more transmitters, receivers, transceivers, chipsets, amplifiers, filters, control logic, network interface cards (NICs), antennas, and so forth. Examples of a transceiver may include a MIMO transceiver, SIMO transceiver, MISO transceiver, Multi Receiver Chain (MRC) transceiver, and so forth. Examples of an antenna may include an internal antenna, an external antenna, a monopole antenna, a meandered monopole antenna, a dipole antenna, a balanced antenna, a printed helical antenna, a chip antenna, a ceramic antenna, a planar inverted-F antenna (PIFA), a helical antenna, an end fed antenna, an omni-directional antenna, a circularly polarized antenna, a micro-strip antenna, a diversity antenna, a dual antenna, an antenna array, and others.

Although FIG. 1 may show a limited number of devices by way of example, it can be appreciated that mobile WiMAX system 100 may include additional devices or nodes for a given implementation. For example, WiMAX system 100 may include several multi-user groups, multiple base stations, and other mobile stations. In addition, a base station may form part of an Access Service Network (ASN) and be coupled to an Access Service Network Gateway (ASN-GW).

The ASN-GW may couple the base station to a Connectivity Service Network (CSN) comprising content services, support systems, routers, servers (e.g., application servers, AAA servers, DNS/DHCP servers), user databases, gateway devices, and other components. CSN may access other CSNs, Application Service Provider (ASP) networks, and/or the Internet. In some embodiments, a mobile station may form part of or connect to a network such as a Local Area Network (LAN), a Wireless LAN (WLAN), a Wireless Fidelity (WiFi) network, a Metropolitan Area Network (MAN), a Wireless MAN (WMAN), a Wide Area Network (WAN), a Wireless WAN (WWAN), a Personal Area Network (PAN), a Wireless PAN (WPAN), and so forth.

Mobile WiMAX system 100 may be used to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner.

The media and control information may be communicated from and to a number of different devices or networks. In various implementations, the media information and control information may be segmented into a series of packets. Each packet may comprise, for example, a discrete data set having a fixed or varying size represented in terms of bits, bytes, octets, and so forth. It can be appreciated that aspects of the described embodiments may be applicable to various types of communication content or format, such as frames, fragments, cells, windows, units, and others.

In various embodiments media and control information may be communicated over a wireless communication channel. Examples of a wireless communication channel may include, without limitation, a radio channel, infrared channel, radio-frequency (RF) channel, a portion of the RF spectrum, and/or one or more licensed or license-free frequency bands. The wireless communication channel may be arranged to support one or more point-to-point connections. Multiple connections may share resources (bandwidth, time, frequency, code, and space) of the physical wireless communication channel.

In order to establish one or more connections for communicating information within mobile WiMAX system 100, various operations may be required such as downlink (DL) synchronization, ranging, capabilities negotiation, authentication, registration, and IP connectivity operation to enable network access. For clarity and ease of understanding, various embodiments may refer to a particular multi-user group 104 and/or a particular mobile station such as MS 106-1. It can be appreciated, however, that the described embodiments may be applicable to any mobile station of multi-user group 104, other multi-user groups, as well as other mobile stations.

BS 102 may periodically transmit to serving sector(s) link description messages such as a downlink channel descriptor (DCD) message to indicate characteristics of DL channel and an uplink channel descriptor (UCD) message to indicate characteristics of UL channel. The UCD and DCD messages may contain burst profile information, modulation information, error-correction information, preamble length, and so forth. MS 106-1 may scan for and detect DCD and UCD messages from BD 102 to obtain DL and UL parameters and to synchronize with the DL.

MS 106-1 may receive an uplink media access protocol MAP (UL-MAP) message and a downlink MAP (DL-MAP) message from BS 102. The UL-MAP and DL-MAP may indicate usage of the UL and DL, respectively, and define control information such as burst start times and sub-channel allocation. The UL-MAP message may contain an Information Element (IE) indicating time slots in which MS 106-1 can transmit during the UL subframe. BS 102 may use scheduling techniques such as Uplink Bandwidth Allocation Scheduling to determine the UL-MAP, IE, and time slots.

MS 106-1 may send a ranging request message to BS 102. MS 106-1 may transmit the ranging request message using minimum transmission power. If BS 102 does not respond, MS 106-1 may send additional ranging request messages using higher transmission power until a ranging response is received from BS 102. The ranging response message from BS 102 may indicate success or required time, frequency, and/or power corrections. If corrections are required, MS 106-1 may make the required corrections and transmit another ranging request.

After successful ranging, MS 106-1 may report capabilities to BS 102 for negotiation. BS 102 may accept or deny access to the MS 106-1 based on such capabilities. MS 106-1 may send BS 102 a requested modulation and coding scheme (MCS) in the DL. The MCS may support Adaptive Modulation and Coding (AMC) having variable code rate and repetition rate. The MCS may include information such as baseband modulation (e.g., QPSK, 16QAM, 64QAM), type of FEC (e.g., CC, CTC), coding rate (e.g., ½, ⅔, ¾, ⅚), repetition rate (e.g., ×2, ×4, ×6), duplex method (e.g., TDD, FDD), and so forth. MS 106-1 may send BS 102 a Channel Quality Indicator (CQI) report indicating channel conditions such as Physical Carrier to Interface and Noise Ratio (CINR), Effective CINR, MIMO mode, selected sub-channel, and so forth.

After successful capability negotiation, BS 102 may authenticate MS 106-1 and provide necessary information (e.g., certificates, algorithms, protocols) to enable MS 106-1 to support encryption/decryption. MS 106-1 and BS 102 may exchange registration request and response messages. The registration may involve the exchange of various parameters such as IP version support, managed/non-managed support, ARQ support, classification support, CRC support, flow control, and others. MS 106-1 may obtain an IP address and other parameters to establish IP connectivity and download operational parameters.

In various embodiments, users or mobile stations in the serving sector(s) of BS 102 may be grouped into different multi-user groups according to reported channel conditions (e.g., CQI reports), requested MCS in the DL, and/or other scheduling considerations in accordance with the described embodiments. In some cases, each multi-user group may have a different MCS. In other cases, multiple multi-user groups may be associated with the same MCS. As shown in FIG. 1, for example, BS 102 may categorize mobile stations MS-106-1-M into a particular multi-user group, such as multi-user group 104 (e.g., Multi-user Group$_k$). In this example, each of MS-106-1-M of multi-user group 104 (e.g., Multi-user Group$_k$) may have similar channel conditions and/or requested the same MCS (e.g., MCS$_k$).

The number of users or mobile stations in each multi-user group may vary between zero and a maximum value max ($N_{user}$). The maximum value max($N_{user}$) may be fixed and specified either as part of system configuration information or standard specification. The maximum value max($N_{user}$) may be set according to certain pre-determined criteria related to deployment and operating conditions of the network. When employing a frame check sequence, for example, frame error rate may increase beyond sufficient error detection capability when the number of users exceeds a certain limit (due to increasing size of the multi-user packet). In various embodiments, the maximum value max($N_{user}$) may be set to 8 in order to ensure sufficient error protection. It can be appreciated, however, that other values may be used depending on the deployment and operating conditions of the network.

The grouping operation implemented by BS 102 may be dynamic and adaptive to user channel conditions and/or other scheduling or QoS requirements. Accordingly, each multi-user group and/or the number of users within each multi-user group may change over time. This provides flexibility and allows link-adaptation because different MCSs can be assigned to a particular user depending on channel conditions from one frame to the next. For example, a particular user (e.g., $user_i$) may belong to one multi-user group (e.g., multi-user $group_k$ associated with $MCS_k$) at time $t_0$ and may belong to another multi-user group (e.g., multi-user $group_m$ associated with $MCS_m$) at time $t_1$ (e.g., next frame) due to varying channel conditions. Accordingly, multi-user resource allocation does not limit the link-adaptation or data-rate adaptation in the DL since the users are adaptively grouped based on their channel quality reports, requested data rate, or other link-level or system-level parameters. Therefore, multi-user scheduling and resource allocation can be adapted to the varying radio channel conditions of the users in the serving sector.

The multi-user groups generally may be updated frequently by BS 102. To minimize the impacts on scheduling complexity at BS 102, the update period should be limited (e.g., to the transmission time interval or the radio frame intervals). It can be appreciated, however, that the update period may change depending on implementation considerations.

BS 102 may assign a multi-user Medium Access Protocol Information Element (MU-MAP_IE) to each multi-user group. In various embodiments, each multi-user MU-MAP_IE may correspond to a specific MCS which includes information such as baseband modulation, type of FEC, coding rate, repetition rate, and so forth. For example, BS 102 may assign MU-MAP_$IE_k$ to multi-user group 104 (e.g., Multi-user $Group_k$ associated with $MCS_k$).

In various implementations, a multitude of MU-MAP_IEs may be reserved for assignment to multi-user groups. The cardinality of the set of MU-MAP_IEs may be equal to or greater than the number of available MCS levels used by BS 102 in the DL described as part of system configuration information. The structure of the MU-MAP_IE may be similar to the existing MAP_IE; however, the use is different. Depending on the operating conditions, some of the MU-MAP_IEs may be reused.

To support QoS and prior to any data transmission, the MAC layers of BS 102 and MS 106-1 may establish one or more types of connections. In various embodiments, the MAC layers of BS 102 and MS 106-1 may comprise several functional MAC layer components or modules. As shown in FIG. 1, for example, the MAC layer of BS 102 may comprise a MAC convergence sublayer (CS) component 108 and a MAC common part sublayer (CPS) component 110. The MAC layer of MS 106-1 may comprise a MAC CS component 112-1 and a MAC CPS component 114-1, and the MAC layer of MS 106-M may comprise a MAC CS component 112-M and a MAC CPS component 114-M. MAC CS components 108, 112-1-M may be arranged to perform operations such as packet classification for outbound packets and packet reconstruction of inbound packets, as well as other operations in accordance with the described embodiments. MAC CPS components 110, 114-1-M may be arranged to perform operations such as packet scheduling of outbound packets and packet processing of inbound packets, as well as other operations in accordance with the described embodiments.

It is to be appreciated that the described MAC layer components may be implemented by one or more chips or integrated circuits (ICs) and may comprise, for example, hardware and/or software such as logic (e.g., instructions, data, code, etc.) to be executed by a logic device (e.g., processor, core, controller, computer, etc.). Executable logic may be stored internally or externally to a logic device on one or more types of computer-readable storage media such as volatile or non-volatile memory, removable or non-removable memory, erasable or non-erasable memory, writeable or re-writeable memory, and so forth. It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

The connections provided by the MAC layers of BS 102 and MS 106-1-M may support various types of transmission such as unicast transmission between a sender and a specified recipient (e.g., point-to-point), multicast transmission between a sender and multiple specified recipients (e.g., point-to-multipoint), broadcast transmission between a sender and all recipients within a coverage area, and others. The type of connection may be defined according to the type of data to be transmitted and/or direction of the data traffic flow.

When data is received at the MAC layer for transmission, outbound packets are associated with a service flow. The service flow may be associated with a particular QoS and various parameters such as bandwidth, latency, jitter, and other QoS parameters. For a particular service flow, one or more connections are established between BS 102 and MS 106-1-M for communicating packets. As shown in FIG. 1, for example, service flow 116 may comprise a unidirectional flow of packets to be transmitted from BS 302 to MS 106-1-M of multi-user group 104.

To create a connection, BS 102 and MS 106-1-M may exchange various messages such as DSA messages. For some service flows, such as pre-provisioned service flows, connection creation may be initiated by BS 102. In such cases, BS 102 may send a DSA-REQ message to MS 106-1-M. Each of MS 106-1-M may confirm creation of the connection by sending a DSA-RSP message to BS 302. For other service flows, such as non-preprovisioned service flows, connection creation may be initiated by MS 106-1-M. In such cases, each of MS 106-1-M may send a DSA-REQ message, and BS 102 may respond with a DSA-RSP message to confirm creation of the connection.

When established, each connection may comprise a unidirectional logical link in either the downlink (DL) or uplink (UL) direction. In various embodiments, DL and UL channels may comprise, for example, transport connections for the transmission of user data traffic flows and management connections for the transmission of MAC control and/or signaling data. In general, a connection is set up when a data/VoIP session begins between MS 106-1-M and BS 102 and is torn down after completion of the data session.

As shown in FIG. 1, for example, DL channel 118 may be established between BS 102 and MS 106-1-M of multi-user group 104. DL channel 118 may comprise, for example, a DL shared channel supporting unidirectional point-to-multipoint or point-to-point transport connections between BS 102 and MS 106-1-M of multi-user group 104. It is to be appreciated that DL channel 118 is shown for purposes of illustration, and not limitation, and that a greater or fewer number of DL channels and/or connections may be established for a given implementation.

In various embodiments, transport connections established between BS 102 and MS 106-1-M of multi-user group 104 may be identified by an m-bit compact connection identifier (CCID) value. Each m-bit CCID value may serve as a temporally unique address for data and/or MAC management transmissions over air-interface. As shown in FIG. 1, for example, the transport connection between BS 102 and MS 106-1 may be identified by CCID-1, and the transport connection between BS 102 and MS 106-M may be identified by CCID-x, where x may represent any positive integer value in accordance with the described embodiments. In various implementations, BS 102 may assign CCID values to the transport connections when users are grouped.

Each m-bit CCID value may have a fewer number of bits (e.g., m<<16 bits) than a conventional CID for a GMH or a BW-REQ header. In an exemplary embodiment, the m-bit CCID value may comprise 4 bits (e.g., m=4). It can be appreciated, however, that other values of m may be utilized to reduce the size of MAC header overhead provided that the CCID value includes a fewer number of bits compared to a full 16-bit CID for a GMH or a BW-REQ header (e.g., m<<16). It is noted that the m-bit CCID value may be used in exclusively in the DL direction. In some embodiments, CCID values may be used exclusively to replace transport connection CIDs. In other embodiments, CCID values may be used to replace transport connection CIDs as well as management connection (e.g., basic, primary, and secondary) CIDs.

Data packets to be transported over DL channel 118 from BS 102 to MS 106-1-M of multi-user group 104 may comprise VoIP data, interactive gaming data, or types of application data having frequent small payloads. When received at the MAC layer of BS 102, the data packets may be associated with a service flow 116, classified by the MAC CS component 108, encapsulated within a multi-user packet data structure 120, and queued for transmission over DL channel 118. In various embodiments, multi-user data structure 120 may be used exclusively in the DL direction from BS 102.

In some embodiments, multi-user packet data structure 120 may comprise a multi-user MAC header structure 122, a multi-user data payload field 124, and a Multi-user Frame Check Sequence (MFCS) field 126 (denoted as Type I structure) as shown in FIGS. 1-3A. In other embodiments, multi-user packet data structure 120 may comprise a multi-user MAC header structure 122, a Multi-user Header Check Sequence (MHCS) field 123, and a multi-user data payload field 124 (denoted as Type II structure) as shown in FIG. 3B.

Multi-user MAC header structure 122 may include each of the m-bit CCID values associated with MS 106-1-M of multi-user group 104. Each of MS 106-1-M may receive a DL MAP and detect a MU-MAP_IE which addresses multi-user packet data structure 120. Upon detecting the MU-MAP_IE, one or more of MS 106-1-M may determine that multi-user packet data structure 120 contains a downlink user data packet to be received. Once a CCID value and the packet length corresponding to a particular user have been detected, the location of the data payload corresponding to that particular user can be calculated and the data can be extracted. In various implementations, the fields including the m-bit CCID values typically are not encrypted and the length of each user data packet is known so that users can easily calculate the location of corresponding data packets.

Multi-user data payload field 124 may be arranged to include a plurality of user data packets to be received by a plurality of MS 106-1-M of multi-user group 104. In various embodiments, all user data packets included in multi-user data payload field 124 may use the same MCS. However, it is recommended that a more robust MCS be used for the multi-user header structure 122 to further improve reliability. Consequently, the MCS used for the multi-user header structure 122 and that used for the multi-user payload field 124 may be different. In an exemplary embodiment, multi-user data payload field 124 may comprise data payloads associated with one or more small-packet applications, such as VoIP and interactive gaming. The number of user data packets per multi-user packet may be limited to a maximum number that is either specified and signaled during system configuration or as part of standard specification. In an exemplary embodiment, the maximum number of user data packets may be set to 8 to ensure an acceptable probability of error ($P_e$) for the multi-user packet. It can be appreciated that $P_e$ is higher for larger multi-user packets.

In Type I multi-user packets (FIG. 3A), Multi-user Frame Check Sequence (MFCS) field 126 may be arranged to include a CRC value corresponding to multi-user packet data structure 120 including multi-user MAC header 122 and multi-user data payload field 124. In various embodiments, a single CRC value may be calculated for all user data packets included in multi-user data payload field 124. In such embodiments, the CRC overhead may be shared by the individual user data packets included in multi-user data payload field 124.

In Type II multi-user packets (FIG. 3B), Multi-user Header Check Sequence (MHCS) field 123 may be arranged to include a CRC value corresponding to multi-user MAC header structure 122. In such embodiments, the CRC overhead may be shared by the individual user data packets included in multi-user data payload field 124.

In various implementations, multi-user packet data structure 120 may be implemented as an OFDMA frame transmitted from BS 102 to MS 106-1-M of multi-user group 104 over a mobile WiMAX air interface. Mobile WiMAX air interface may support OFDMA techniques including multiplexing operations for subdividing bandwidth into multiple frequency subcarriers. OFDMA techniques may improve multipath performance by coding and interleaving information across subcarriers prior to transmission. When implemented by an OFDM frame, multi-user packet data structure 120 may be included in a DL subframe of OFDMA frame. For example, an OFDM frame for TDD (Time Division Duplex) operation may comprise DL and UP sub-frames, and multi-user packet data structure 120 may be included in a DL burst within the DL subframe. It can be appreciated that multi-user packet data structure 120 does not impose a significant complexity on the WiMAX air-interface including base station and mobile station implementations.

In addition to multi-user packet data structure 120, an OFDM frame may comprise various control information such as a preamble used for synchronization, a Frame Control Header (FCH) used for frame configuration information (e.g., burst profile, burst length), an uplink media access protocol MAP (UL-MAP) to indicate UL usage, a downlink MAP (DL-MAP) to indicate DL usage, a UL ranging sub-channel used for adjustments (e.g., time, frequency, power) and bandwidth requests, a UL Channel Quality Indicator Channel (CQICH) for reporting channel state information, and an UL Acknowledge (ACK) channel for Automatic Repeat Request (ARQ) or Hybrid ARQ (H-ARQ) Acknowledgement/Negative Acknowledgement (ACK/NACK) signaling.

Mobile WiMAX air interface may support ARQ or H-ARQ retransmission operations. For example, reception of multi-user packet data structure 120 by each of MS 106-1-M of multi-user group 104 may vary. Namely, while one user (e.g., MS-106-1) may correctly receive multi-user packet data structure 120, check the CRC in MHCS field 123 or MFCS field 126, and correctly decode its own data packet included in multi-user payload field 124, another user (e.g., MS 106-M) in the same multi-user group (e.g., multi-user group 104) may not be able to correctly receive its data packet and therefore may require retransmission. In such a case, the user (e.g., MS 106-M) that does not correctly detect the multi-user MAC header structure 122 shall not send a NACK message to BS 102. When ARQ or H-ARQ retransmissions are allowed, the incorrectly received data may be retransmitted within another multi-user data packet using the same of different MCS or within a single-user data packet.

The detection and decoding of, for example, a Type II multi-user packet may be performed as follows. It can be appreciated that detection and decoding of a Type I multi-user packet may be performed in a similar manner with the exception of use of MFCS instead of MHCS.

The CRC is calculated based on the multi-user MAC header and compared to MHCS. If MHCS check is successful, the user must check if CCID matches its own pre-assigned connection IDs. If MHCS fails, no NACK shall be transmitted. It is noted that the base station only schedules ACK/NACK uplink transmission for the users with downlink traffic in the multi-user packet.

If user's CCID is detected, the user payload is extracted and checked for errors. If no error is detected, ACK is sent to acknowledge successful transmission. If error is detected, NACK is sent to request for retransmission. If H-ARQ Incremental Redundancy (IR) is used, the base station will transmit additional redundancy in the following single-user or multi-user packet for this user. If H-ARQ Chase Combining (CC) is used, the base station will retransmit the same payload in the following single-user or multi-user packet for this user. During H-ARQ process, if the user fails to detect the multi-user packet, it shall wait for the next successful retransmission (additional delay for H-ARQ combining process).

The user combines the packets that it has received via multi-user packet and attempts detection until successful or maximum number of retransmissions is reached. It is noted that that users shall successfully detect multi-user packet and extract their own packet (if any) before being able to decode their own packets.

It can be appreciated that multi-user packet data structure 120 imposes no significant complexity on the WiMAX air-interface for ARQ or H-ARQ implementations. It also can be appreciated that ARQ or H-ARQ operation, when enabled, neither interferes nor impacts the performance of the multi-user packet data structure 120 since the reception of multi-user packets by each user is usually different and dependent on the varying channel conditions experienced by that user.

Figure 2:
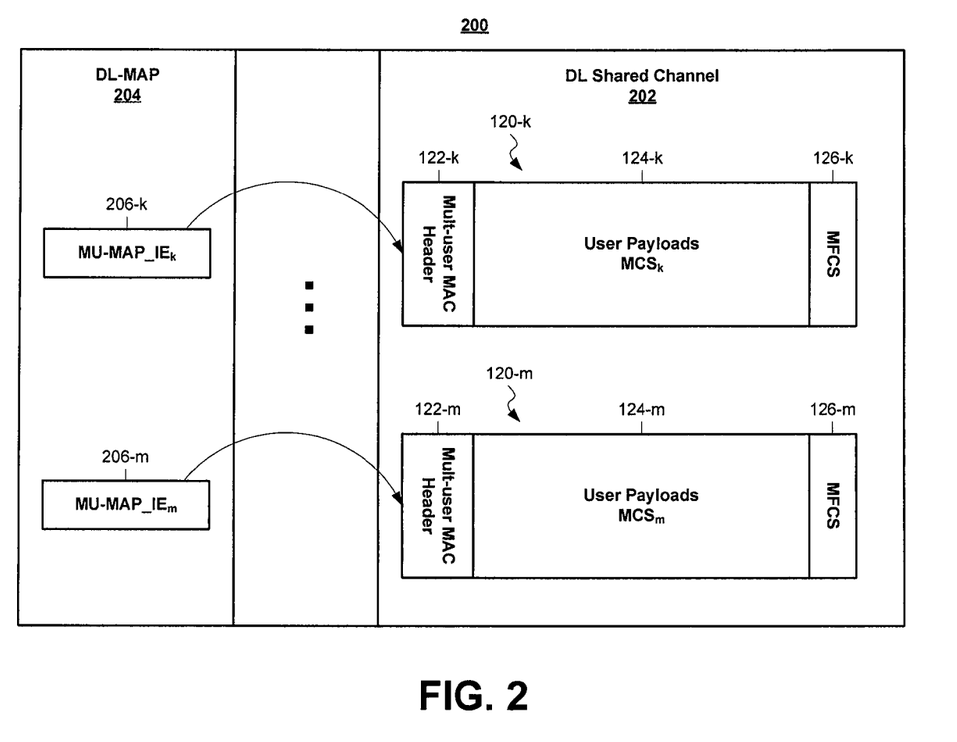
FIG. 2 illustrates multi-user resource allocation in the downlink in accordance with various embodiments.

FIG. 2 illustrates one embodiment of multi-user resource allocation 200 in DL Shared Channel 202. As shown, DL Shared Channel 202 may include multi-user packet data structure 120-$k$ and multi-user packet data structure 120-$k$.

In this embodiment, multi-user packet data structure 120-$k$ (Type I) may comprise multi-user MAC header structure 122-$k$, multi-user data payload field 124-$k$, and MFCS field 126-$k$. Multi-user MAC header structure 122-$k$ may comprise CCID values associated with users of Multi-user Group$_k$. Multi-user data payload field 124-$k$ may include user data packets which use MCS$_k$ and are to be received by the users of Multi-user Group$_k$. The number of user data packets may correspond to the number of users in Multi-user Group$_k$. In Type I, MFCS field 126-$k$ may include a CRC value corresponding to multi-user packet data structure 120-$k$ including multi-user MAC header 122-$k$ and multi-user data payload field 124-$k$.

In an alternative embodiment, multi-user packet data structure 120-$k$ (Type II) may comprise MHCS field instead of MFCS field 126-$k$. In Type II, the MHCS field may include a CRC value corresponding to multi-user MAC header 122-$k$ only. In general, the Type II multi-user packet structure is computationally more efficient since the user only calculates the CRC for the multi-user header to compare with MHCS as opposed to calculating the CRC for the entire multi-user packet.

Multi-user packet data structure 120-$m$ (Type I) may comprise multi-user MAC header structure 122-$m$, multi-user data payload field 124-$m$, and MFCS field 126-$m$. Multi-user MAC header structure 122-$m$ may comprise CCID values associated with users of Multi-user Group$_m$. Multi-user data payload field 124-$m$ may include user data packets which use MCS$_m$ and are to be received by the users of Multi-user Group$_m$. The number of user data packets may correspond to the number of users in Multi-user Group$_m$. In Type I, MFCS field 126-$m$ may include a CRC value corresponding to multi-user packet data structure 120-$m$ including multi-user MAC header 122-$m$ and multi-user data payload field 124-$m$. Alternatively, multi-user packet data structure 120-$m$ (Type II) may comprise MHCS field instead of MFCS field 126-$m$. In Type II, the MHCS field may include a CRC value corresponding to multi-user MAC header 122-$m$ only.

The users of Multi-user Group$_k$ and the users of Multi-user Group$_m$ may receive DL MAP 204 which may comprise various IEs including MU-MAP_IE$_k$ 206-$k$ and MU-MAP_IE$_m$ 206-$m$. The users of Multi-user Group$_k$ and the users of Multi-user Group$_m$ may detect MU-MAP_IE$_k$ 206-$k$ which addresses multi-user packet data structure 120-$k$ and detect MU-MAP_IE$_m$ 206-$m$ which addresses multi-user packet data structure 120-$m$. For example, MU-MAP_IE$_k$ 206-$k$ may comprise CCID values corresponding to users of Multi-user Group$_k$, and MU-MAP_IE$_m$ 206-$m$ may comprise CCID values corresponding to users of Multi-user Group$_m$.

One or more users of Multi-user Group$_k$ may determine that multi-user packet data structure 120-$k$ contains a downlink user data packet allocation. Each user of Multi-user Group$_k$ may then use its CCID value to locate a corresponding payload and extract the data. One or more users of Multi-user Group$_m$ may determine that multi-user packet data structure 120-$m$ contains a downlink user data packet allocation. Each user of Multi-user Group$_m$ may then use its CCID value to locate a corresponding payload and extract the data.

It can be appreciated that checking all MU-MAP_IEs in DL-MAP 204 by users of Multi-user Group$_k$ and the users of Multi-user Group$_m$ may add complexity. Depending on the channel conditions or the requested MCS, a particular mobile station may ignore certain MU-MAP_IEs that correspond to MCSs that are not usable by the mobile station. This would decrease the amount of processing that a mobile station should perform in order to detect data packets belonging to the user associated with that mobile station. Accordingly, power consumption involved with examining DL-MAP 204 in each radio frame can be reduced by avoiding examination of DL-MAP 204 and/or excluding certain MU-MAP_IEs from examination in certain situations. For example, examination of DL-MAP 204 may be avoided and/or certain MU-MAP_IEs can be excluded for certain applications (e.g., VoIP applications) based on expected MCS, current channel conditions, using discontinuous transmission (DTX) mechanisms, and/or expected traffic according to statistical characteristics of speech signals (e.g., in silence intervals, the user does not expect any DL transmission). Consequently, frequent examination of the DL-MAP 204 and all MU_MAP_IEs may be not necessary.

Figure 3A:
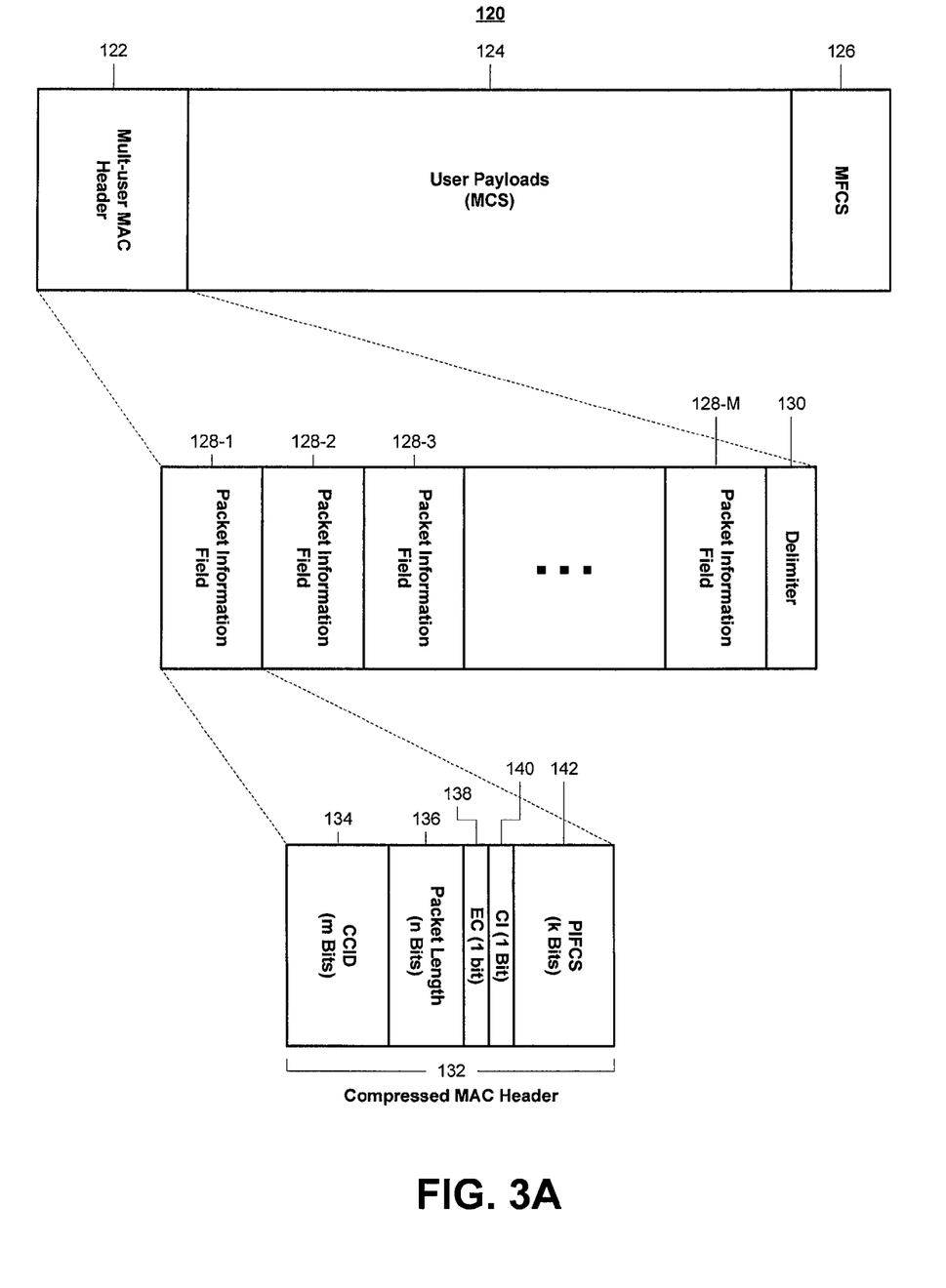
FIG. 3A illustrates one embodiment of a multi-user packet data structure.
Figure 3B:
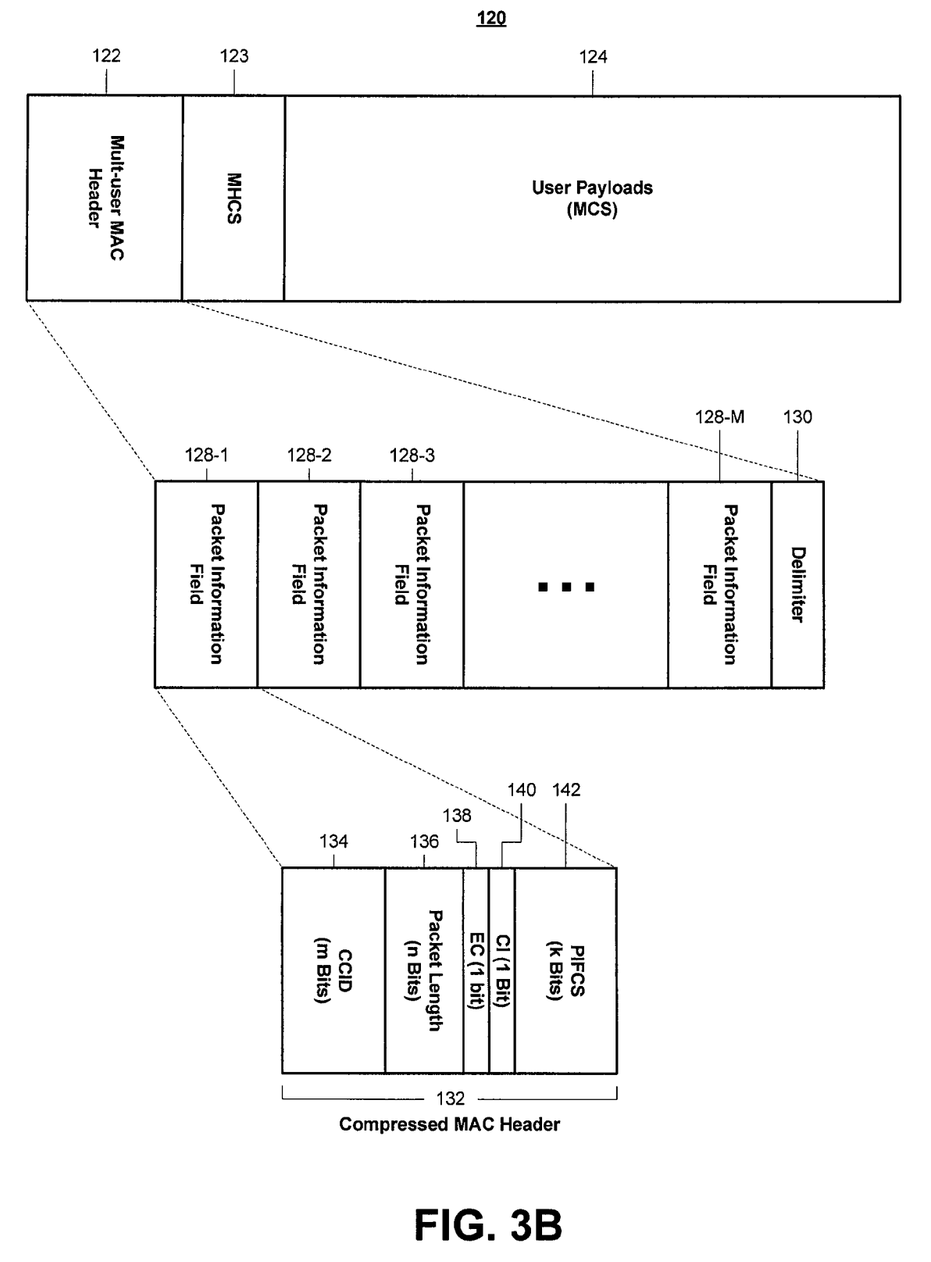
FIG. 3B illustrates one embodiment of a multi-user packet data structure.

FIG. 3A and FIG. 3B illustrate embodiments of multi-user packet data structure 120. As shown in FIG. 3A, multi-user packet data structure 120 (Type I) may comprise a multi-user MAC header structure 122, a multi-user data payload field 124, and MFCS field 126. As shown in FIG. 3B, multi-user packet data structure 120 (Type II) may comprise multi-user MAC header structure 122, MHCS field 123, and multi-user data payload field 124.

In various embodiments, multi-user MAC header structure 122 may include the m-bit CCID values associated with MS 106-1-M of multi-user group 104. A user may detect a corresponding CCID value, locate a data payload, and extract the data.

Multi-user data payload field 124 may be arranged to include a plurality of user data packets to be received by a plurality of MS 106-1-M of multi-user group 104. In an exemplary embodiment, multi-user data payload field 124 may be arranged to include M user data packets. All user data packets included in multi-user data payload field may use the same MCS. Multi-user data payload field 124 may comprise data payloads associated with one or more small-packet applications, such as VoIP and interactive gaming. In various embodiments, the length of each user data packet may vary; however, given the packet length of each user payload, users can easily locate their corresponding data payloads.

MFCS field 126 may be arranged to include a CRC value corresponding to the entire multi-user packet data structure 120 including multi-user MAC header 122 and multi-user data payload field 124. MHCS field 123 may be arranged to include a CRC value corresponding to only the multi-user MAC header 122. In various embodiments incorporating Type I multi-user packets, a single CRC value may be calculated for all user data packets (e.g., M user data packets) included in multi-user data payload field 124. In such embodiments, the CRC overhead may be shared by the individual user. In other embodiments incorporating Type II multi-user packets, a single CRC value may be calculated for the multi-user MAC header 122. In such embodiments, the CRC overhead also may be shared by the individual users.

In various embodiments, multi-user MAC header structure 122 may comprise a plurality of Packet Information Fields (PIFs) 128-1-M, where M is the number of user data packets included in multi-user data payload field 124. For example, multi-user MAC header structure 122 may comprise PIF 128-1 and 128-2 when two user data packets are packed into multi-user data payload field 124. The number of user data packets may be limited to a maximum number that is specified and signaled either during system configuration or specified in the standards specification. In an exemplary embodiment, the maximum number of user data packets may be set to 8 to ensure an acceptable $P_e$ for multi-user packet data structure 120. In general, PIFs 128-1-M in multi-user MAC header structure 122 shall not be encrypted to facilitate detection of data payloads by mobile stations.

In some embodiments, multi-user MAC header structure 122 may include a delimiter field 130 to identify the size of the multi-user MAC header and/or the end of the PIFs 128-1-M. Delimiter field 130 may be arranged to include a unique j-bit sequence, where j is any integer value in accordance with the described embodiments. In general, the value of j-bit sequence may be small to lower MAC overhead. It can be appreciated that delimiter field 130 may be optional and/or unnecessary for implementations in which the number of the PIFs is fixed.

Each of the PIFs 128-1-M may comprise a compressed MAC header structure 132. As shown, each PIF (e.g., PIF 128-1) may comprise a CCID field 134 (m Bits), a packet length field 136 (n Bits), an encryption control (EC) field 138 (1 Bit), a CRC indicator (CI) field 140 (1 Bit), and a Packet Information Field Check Sequence (PIFCS) field 142 (k Bits, k>=0).

The multi-user MAC header 122 may be arranged to simplify the contents of and/or remove redundancies for small-packet applications, such as VoIP and interactive gaming. In various implementations, the size of each PIF may be fixed (e.g., n+m+k+2 bits). Accordingly, the size of each of the PIFs 128-1-M may be known. In an exemplary embodiment, the size of multi-user MAC header 122 may be 2M octets for PIFs 128-1-M, where for each PIF n=6, m=4, k=4 (n+m+k+2=16 bits=2 octets) and thereby optional delimiter field 130 is omitted.

CCID field 134 may be arranged to include an m-bit CCID value for identifying a connection between a base station and a mobile station. When established, a connection may comprise a unidirectional logical link between the base station and the mobile station in the DL direction. In various implementations, DL connections may comprise, for example, transport connections for the transmission of user data traffic flows and management connections for the transmission of MAC control and/or signaling data.

Each m-bit CCID value may serve as a temporally unique address for data and/or MAC management transmissions over the air-interface. The m-bit CCID value may have a fewer number of bits (e.g., m<<16) than a conventional connection identifier (CID) for a GMH or a BW-REQ header. In an exemplary embodiment, the m-bit CCID value may comprise 4 bits (e.g., m=4). Other values of m may be utilized to reduce the size of MAC header overhead provided that the CCID value includes a fewer number of bits compared to a full 16-bit CID for a GMH or a BW-REQ header.

In various implementations, a mobile station (e.g., MS 106-1) may detect the CCID value in CCID field 134 after receiving a DL MAP including a MU-MAP_IE which addresses multi-user packet data structure 120. Upon detecting the MU-MAP_IE, the mobile station may determine that multi-user packet data structure 120 contains a downlink user data packet allocation for that mobile station. The mobile station may detect the CCID value in CCID field 134, locate the corresponding data payload in multi-user data payload field 124, and extract the data.

It is noted that the m-bit CCID value may be exclusively used in the DL direction and may be used to replace transport connection CIDs as well as management connection (e.g., basic, primary, and secondary) CIDs. The management connections may comprise DL connections and may correspond to different QoS levels of management traffic including basic, primary, and secondary QoS levels. The management connections may be used, for example, to dynamically manage the QoS parameters associated with a particular service flow that define the transmission ordering and scheduling on the air-interface.

Packet length field 136 may be arranged to include an n-bit packet length value for indicating the size of the user data payload for the particular user. In various embodiments, the n-bit packet length value may comprise as few as 6 bits, corresponding to the maximum size of the user data payload of 64 octets, which is suitable for VoIP and interactive gaming applications. For example, a statistical analysis based on available statistical models for VoIP and interactive gaming payloads suggests that the average length of VoIP user packets is less than 40 octets (e.g., 7 to 33 octets for 3GPP AMR voice codec), and the average length of interactive gaming user packets is less than 64 octets. Therefore, packet length field 136 may include an n-bit packet length value as small as 6 bits.

In exemplary embodiment, the n-bit packet length value included in packet length field 136 may comprise 6 bits (e.g., n=6). It can be appreciated, however, that other values of n may be utilized. For example, in some embodiments, additional contiguous or non-contiguous data payloads can be assigned to the same user to accommodate a large payload. In the event that the number of octets in the user data payload is greater than $2^n$, multiple CCID values or the same CCID value may be assigned to data packets for the same user to enable distinction of the user data payloads.

EC field 138 may be arranged to include a 1-bit EC value for indicating encryption of the user data payload. In various implementations, the user data payload may be encrypted or unencrypted. In an exemplary embodiment, the EC value may indicate that the user data payload is encrypted if set to 1 (e.g., EC=1) and otherwise (e.g., EC=0) that the user data payload is not encrypted. It can be appreciated that other mechanisms for indicating user data encryption may be utilized.

CI field 140 may be arranged to include a 1-bit CI value for indicating that a CRC value (generally known as FCS) follows a user data payload. In various embodiments, the size of such a CRC value must be specified either during system configuration or in the standard specification. It is noted that the optional user payload CRC value is different from the mandatory 4-octet CRC (i.e., MFCS) in Type I or 2-octet CRC (i.e., MHCS) in Type II that follows the multi-user packet or multi-user MAC header, respectively. It also is noted that CRC values associated with the user data payloads and CRC value associated with either the multi-user packet or multi-user MAC header are mutually exclusive. In an exemplary embodiment, the CI value may indicate that the user data payload is followed by a CRC value if set to 1 (e.g., CI=1) and otherwise (e.g., CI=0) that no CRC value follows the multi-user data payload. It can be appreciated that other mechanisms for indicating a CRC value may be utilized.

PIFCS field 142 may be arranged to include a k-bit PIF check sequence (PIFCS) value to provide further error protection for each packet information field. A k-bit (k>=0) PIFCS field 142 should be included in each PIF. The PIFCS value may be calculated exclusively on the packet information field (i.e., CCID, Length, EC, and CI). In various implementations, Cyclic Redundancy Check 4 (CRC-4), i.e. 4-bit CRC, is recommended for overhead reduction. It is noted that the size of PIFCS can be as small as zero bits.

In various implementations, multi-user packet data structure 120 may enable more efficient handling of small data packets, such as VoIP and interactive gaming, with lower overhead and reduced scheduling delay. For example, MAC header overhead may be reduced for small-packet applications by a factor of 75%, depending on the system configuration. It can be appreciated that, in some embodiments, the conventional 10 octet overhead corresponding to GMH (6 octets) and CRC (4 octets) for each user data packet may be reduced to 2½ octets for each user data packet corresponding to the Packet Information Field (2 octets) for each user data packet and the MFCS field (4 octets) including an overall CRC value that is used to protect the maximum number of user packets (e.g., M=8). It is assumed that no individual CRCs are used for the user packets. Thus, CRC overhead is distributed among user data packets.

This reduction in MAC header overhead as well as simultaneous scheduling of M users in the DL may translate directly into higher capacity (e.g., VoIP capacity) and lower end-to-end latency for delay sensitive applications without significantly increasing the complexity of the air-interface. Reduction in the latency arises from the fact that instead of sequentially scheduling M user packets, M user packets are scheduled and transmitted simultaneously. Accordingly, the end-to-end delay for the user application is reduced. This reduction in scheduling delay may be extremely beneficial for various types of delay sensitive applications, such as VoIP and interactive gaming applications.

Multi-user packet data structure 120 may be designated for use by one or more small-packet applications, such as VoIP and interactive gaming. It can be appreciated, however, that the embodiments are not limited in this regard. For example, multi-user packet data structure 120 may find applicability in various small-packet applications which would benefit from a reduction in MAC header overhead and/or scheduling delay. In some embodiments, use of multi-user packet data structure 120 may be employed based on the relationship of a conventional MAC header and CRC to the user data payload. For instance, if the ratio of the overhead corresponding to a conventional MAC header (e.g., GMH or BW-REQ header) and CRC to the user data payload would be greater than a certain threshold (e.g., 25%), then significant MAC overhead reduction could be achieved by utilizing multi-user packet data structure 120.

It can be appreciated that the described embodiments may be implemented by the MAC layer of a wireless device designed to operate in accordance with the IEEE 802.16e-2005 standard and/or the evolving IEEE 802.16m standard. For example, the MAC layer of a base station or mobile station may implement aspects of the described embodiments as part of downlink packet detection and decoding procedures required to extract the user data payloads in order to significantly increase the capacity and performance of small-packet applications such as VoIP and interactive gaming.

It also can be appreciated that it may be necessary to distinguish use of the multi-user MAC header 122 from conventional generic MAC header so that the described embodiments are compatible with legacy devices and/or networks operating in accordance with existing IEEE standards such as IEEE 802.16e-2005, as well as with devices and/or networks operating in accordance with future versions, derivatives, or evolution of the above standards (e.g., IEEE 802.16m). It is noted that the current structure and contents of GMH do not allow addition of version control or any other indictors.

It is noted that use of MU-MAP_IEs is an indication that multi-user packet data structure 120 is utilized and can be used to distinguish multi-user MAC header 122 from a conventional GMH. In various embodiments, use of multi-user packet data structure 120 may be indicated prior to establishing a connection between a base station and a mobile station in order to ensure that both new and legacy mobile stations can schedule and receive service from the base station.

In some embodiments, DCD and/or UCD messages periodically sent by the base station may comprise a length value indicating the size of the m-bit CCID value. By advertising the length of the m-bit CCID value in the DCD and/or UCD message, both new and legacy mobile stations attached to the base station may know in advance to expect a compact connection identifier comprising m-bits (e.g., m=4). The size of CCID (i.e., the value of m) can also be specified by the IEEE 802.16m standard as a fixed value and therefore, no advertisement would be necessary.

In some embodiments, multi-user packet data structure 120 may be used exclusively in certain permutation zones such as permutation zones corresponding to VoIP and/or interactive gaming user traffic. For example, an OFDMA frame may include multiple zones in which either Full Usage of Subchannels (FUSC) or Partial Usage of Subchannels (PUSC) can be implemented. A permutation zone may comprise a number of contiguous OFDMA symbols, in the DL or UL, that use the same permutation scheme. The DL subframe or the UL subframe may contain more than one permutation zone. The permutation formula may map subchannels to physical subcarriers in the OFDMA symbol. The permutation formula may vary for the DL and UL and for FUSC and PUSC modes.

Permutation zones supported by legacy mobile WiMAX systems may be separated from new permutation zones supported by the IEEE 802.16m systems using Time Division Multiplexing (TDM). In some embodiments, every multi-user assignment for VoIP and interactive gaming user traffic in the DL may only use multi-user packet data structure 120.

Figure 4A:
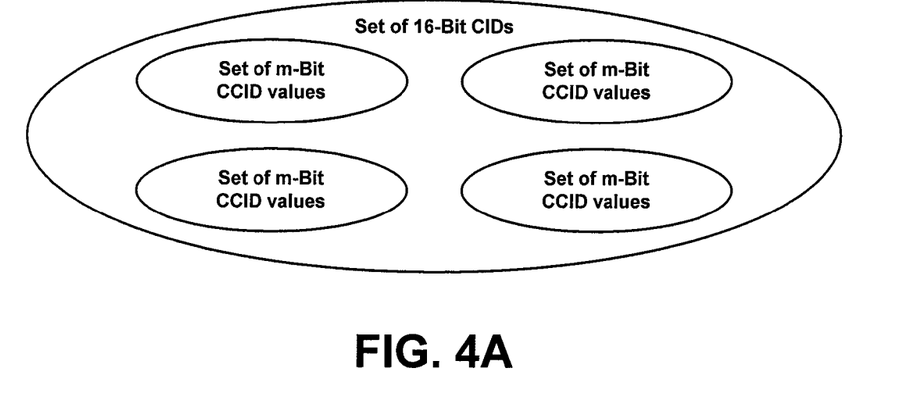
FIGS. 4A-4C illustrate compressed connection identifier (CCID) value selection in accordance with various embodiments.

FIG. 4A illustrates one embodiment of CCID value selection. In various implementations, a connection established between a base station and a mobile station may be assigned an m-bit CCID value, where m<<16 bits. It can be appreciated that using a CCID value reduces the number of unique transport connections as compared to using conventional full 16-bit CIDs. To mitigate this drawback, sets of CCID values may be chosen according to certain provisions.

As shown, the set of conventional 16-bit CIDs includes several sets of m-bit CCID values. Each set of m-bit CCID values may comprise $2^m$ distinct CCID values (e.g., 16 distinct CCID values, where m=4). In various embodiments, a base station may be arranged to assign conventional CIDs in a serving sector among user transport connections according to a certain mapping such that CIDs are grouped by a common portion. For example, the base station may group 16-bit CIDs which have the same MSB portion (e.g., most significant 12 bits) and may maintain awareness of the CIDs that are available and in use by mobile stations.

Figure 4B:
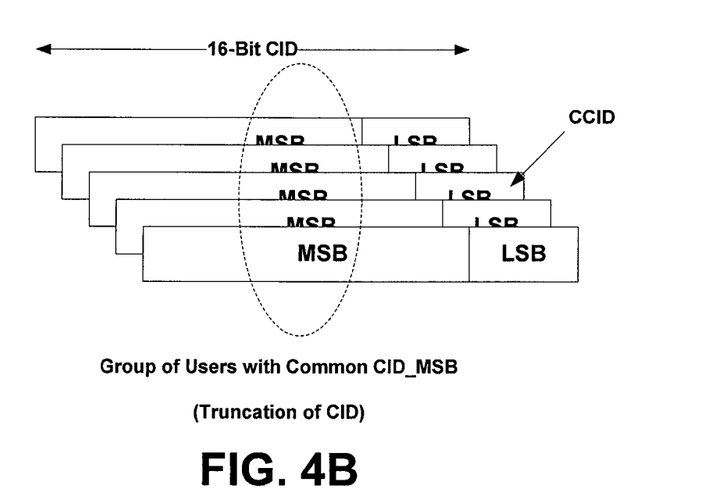

As shown in FIG. 4B, in various implementations, the MSB portion of a group of 16-bit CIDs may be the same. As such, the common portion (e.g., 12-bit MSB portion) of the full 16-bit CIDs may be truncated while maintaining only the differing portions (e.g., 4-bit LSB portions). Each set of m-bit CCID values may comprise the LSB portions of truncated 16-bit CIDs grouped by common MSB portion. In various embodiments, the base station may assign CCID values to user transport connections according to a certain mapping such that each CCID value may comprise an m-bit value (e.g., m<<16) derived from the 4-bit LSB portion of a truncated 16-bit CID.

Conceptually, truncating CIDs in this way is similar to the notion of Reduced CID (RCID) described in the IEEE 802.16e-2005 standard, where the RCID is the LSB portion of the set of CIDs that have been currently assigned and are in use by mobile stations. In accordance with the described embodiments, however, truncating can be used to overcome the limitation on the number of unique CCID values that can be simultaneously assigned to a specific user traffic.

Figure 4C:
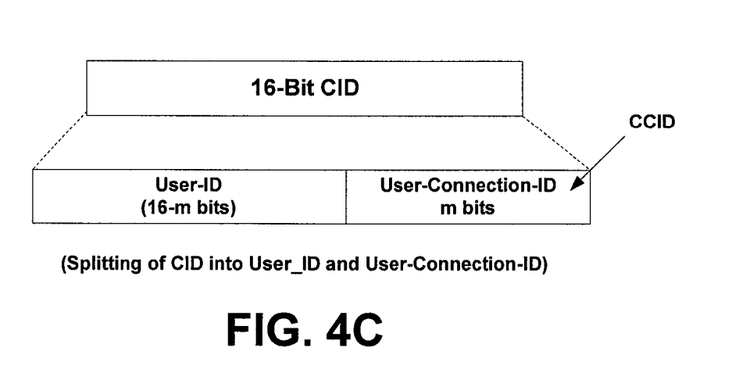

As shown in FIG. 4C, in an alternative implementation, the 16-bit CID may be split into two parts. The MSB portion of the CID may identify the users (i.e., User-ID) and the LSB portion of the CID may identify the management or transport connections corresponding to a specific user (i.e., User-Connection-ID). The User-ID may be signaled through common or dedicated signaling or messaging channels whereas the User-Connection-ID can be specified as part of the compressed MAC header through CCID field. In this case, User-Connection-ID and CCID values are the same.

Figure 5:
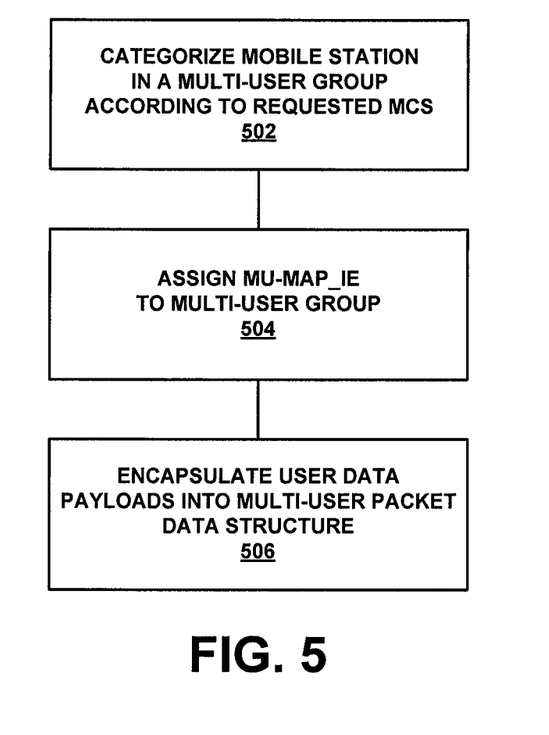
FIG. 5 illustrates a multi-user resource allocation logic flow in accordance with various embodiments.

FIG. 5 illustrates one embodiment of a logic flow 500 for multi-user resource allocation. In various embodiments, logic flow 500 may be performed by various systems and/or devices and may be implemented as hardware, software, and/or any combination thereof, as desired for a given set of design parameters. For example, logic flow 500 may be implemented by a logic device (e.g., computer) and/or logic (e.g., computer program instructions) to be executed by a logic device. For purposes of illustration, and not limitation, reference is made to FIG. 1

Logic flow 500 may comprise categorizing a mobile station (e.g., MS 106-1) in a multi-user group (e.g., multi-user group 104) according to a requested MCS (block 502) or reported channel conditions, assigning a MU-MAP_IE to the multi-user group (block 504), and encapsulating a plurality of user data payloads using the MSC into a multi-user packet data structure 120 to be transmitted over a transport connection to the mobile station (block 506). The embodiments are not limited in this context.

In various embodiments, logic flow 500 may further comprise establishing one or more transport connections to mobile stations included in the multi-user group and assigning an m-bit CCID value to each transport connection. The m-bit CCID value may have a fewer number of bits than a CID for a GMH header. The embodiments are not limited in this context.

Logic flow 500 also may include communicating the MU-MAP_IE to the mobile station and communicating the multi-user packet data structure 120 over the air-interface to the mobile station. The MU-MAP_IE may comprise an associated CCID value for the mobile station. The multi-user packet data structure may include a multi-user MAC header structure comprising an associated CCID value for the mobile station. The embodiments are not limited in the context.

It can be appreciated that, in some embodiments, the conventional 10 octet overhead corresponding to GMH (6 octets) and CRC (4 octets) for each user data packet may be reduced to 2½ octets for each user data packet corresponding to the Packet Information Field (2 octets) for each user data packet and the MFCS field (4 octets) including an overall CRC value that is used to protect the maximum number of user packets (e.g., M=8). This reduction in MAC header overhead as well as simultaneous scheduling of M users may translate directly into higher capacity (e.g., VoIP capacity) and lower end-to-end latency for delay sensitive applications without significantly increasing the complexity of the air-interface.

Figure 6:
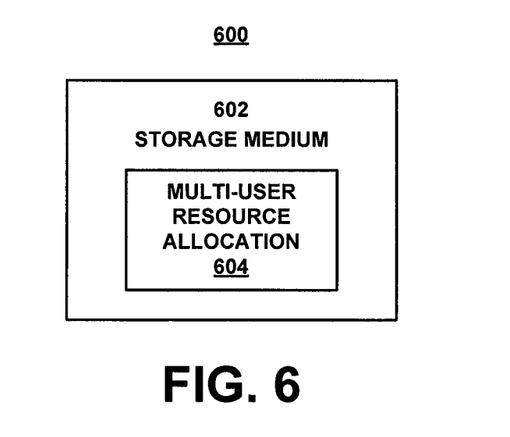
FIG. 6 illustrates an article of manufacture storing multi-user resource allocation logic in accordance with various embodiments.

FIG. 6 illustrates one embodiment of an article of manufacture 600. As shown, article 600 may comprise a computer-readable storage medium 602 to store multi-user resource allocation logic 604. Article 600 may be implemented by various systems and/or devices in accordance with the described embodiments.

Article 600 and/or computer-readable storage medium 602 may include one or more types of computer-readable storage media capable of storing data, including volatile memory or, non-volatile memory, removable or non-removable memory, erasable or non-erasable memory, writeable or re-writeable memory, and so forth. Article 600 and/or computer-readable storage medium 602 may store multi-user resource allocation logic 604 comprising executable computer program instructions that, when executed by a computer, cause the computer to perform methods and/or operations in accordance with the described embodiments.

Multi-user resource allocation logic 604 may comprise, or be implemented as, software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "one embodiment," or "an embodiment" means that a particular feature, structure, or characteristic described in connection with the embodiment is included in at least one embodiment. Thus, appearances of the phrases "in various embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. It can be appreciated that the logic flow merely provides an exemplary implementation of the general functionality. The logic flow does not necessarily have to be executed in the order presented unless otherwise indicated. In addition, the logic flow may be implemented by a hardware element, a software element executed by a computer, or any combination thereof.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a wireless device to categorize a mobile station in a multi-user group according to one or more of a requested modulation and coding scheme (MCS), reported channel condition, or scheduling consideration, to assign one of a plurality of multi-user Medium Access Protocol (MAP) Information Elements (MU-MAP_IEs) comprised within a downlink MAP (DL-MAP) to the multi-user group, to encapsulate a plurality of user data payloads using the same MCS into a multi-user payload field in a multi-user packet data structure to be simultaneously scheduled and transmitted over a downlink transport connection to the mobile station, the assigned MU-MAP_IE to address the plurality of user data payloads in the multi-user payload field, to establish a transport connection to each mobile station included in the multi-user group, to assign a connection identifier (CID) to each transport connection where each of the assigned CIDs comprises a same most significant bit portion, and to assign an m-bit compact connection identifier (CCID) value to each transport connection, the m-bit CCID value for each transport connection having a fewer number of bits than the CID for that transport connection and comprising a least significant bit portion of the connection identifier for that transport connection, the multi-user packet data structure comprising a multi-user MAC header and one of a multi-user frame check sequence (MFCS) field or a multi-user header check sequence (MHCS) field, the MFCS field to include a cyclic redundancy check (CRC) value calculated for the entire multi-user packet data structure including the multi-user MAC header and the plurality of user data payloads included in the multi-user payload field, the MHCS field to include a CRC value calculated for only the multi-user MAC header.

2. The apparatus of claim 1, the MU-MAP_IE comprising an associated CCID value for the mobile station.

3. The apparatus of claim 2, the mobile station to detect the MU-MAP_IE and use the associated CCID value to locate an assigned user data payload in the multi-user packet data structure.

4. The apparatus of claim 1, the wireless device to operate in accordance with one or more Institute for Electronic and Electrical Engineers (IEEE) standards, Third Generation Partnership Project (3GPP) standards, 3GPP Long Term Evolution (LTE) standards, and 3GPP2 Ultra Mobile Broadband (UMB) standards.

5. The apparatus of claim 4, wherein the IEEE standards comprise one or more of IEEE 802.16e-2005 and IEEE 802.16m.

6. A system comprising the apparatus of claim 1 coupled to an antenna.

7. A multi-user packet data structure stored on a non-transitory computer-readable medium to reduce medium access control (MAC) overhead and scheduling delay, the multi-user packet data structure comprising:
   a multi-user payload field to include a plurality of user data payloads assigned to mobile stations of a multi-user group, each of the plurality of user data payloads to use a common modulation and coding scheme (MCS) and the user data payloads to be simultaneously scheduled and transmitted over a downlink transport connection to a mobile station, the plurality of user data payloads addressed by a multi-user Medium Access Protocol (MAP) Information Element (MU-MAP_IE) assigned to the multi-user group, the assigned MU-MAP_IE comprised among a plurality of MU-MAP_IEs in a downlink MAP (DL-MAP);
   a multi-user MAC header structure including a plurality of packet information fields corresponding to the plurality of user data payloads, wherein each packet information field comprises a compact connection identifier (CCID) field, the CCID field to include an m-bit CCID value for identifying a transport connection to a mobile station in the multi-user group, the m-bit CCID value having a fewer number of bits than a connection identifier (CID) assigned to the transport connection and comprising a least significant bit portion of the CID for that transport connection, wherein each of a plurality of transport connections to the mobile stations of the multi-user group comprises a same most significant bit portion; and
   one of a multi-user frame check sequence (MFCS) field or a multi-user header check sequence (MHCS) field, the MFCS field to include a CRC value calculated for the entire multi-user packet data structure including the multi-user MAC header and all user data payloads included in the multi-user payload field, the MHCS field to include a CRC value calculated for only the multi-user MAC header.

8. The multi-user packet data structure of claim 7, the multi-user payload field to include 8 user data payloads.

9. The multi-user packet data structure of claim 7, the user data payloads comprising Voice Over Internet Protocol (VoIP) data.

10. The multi-user packet data structure of claim 7, the user data payloads comprising interactive gaming data.

11. The multi-user packet data structure of claim 7, each packet information field to include an n-bit packet length value, an encryption control (EC) field to include a 1-bit EC value, a cyclic redundancy check (CRC) indicator field (CI) to include a 1-bit CI value, and a packet information field check sequence (PIFCS) field to include a k-bit PIFCS value, where $k>=0$.

12. The multi-user packet data structure of claim 7 comprising an Orthogonal Frequency Division Multiple Access (OFDMA) frame.

13. A method comprising:
   categorizing a mobile station in a multi-user group according to a requested modulation and coding scheme (MCS);
   assigning one of a plurality of multi-user Medium Access Protocol (MAP) Information Element (MU-MAP_IEs) comprised within a downlink MAP (DL-MAP) to the multi-user group;
   encapsulating a plurality of user data payloads using a common MCS into multi-user payload field in a multi-user packet data structure to be simultaneously scheduled and transmitted over a transport connection to the mobile station, the assigned MU-MAP_IE to address the plurality of user data payloads in the multi-user payload field;
   establishing a transport connection to each mobile station included in the multi-user group;
   assigning a connection identifier (CID) to each transport connection, each of the assigned CIDs comprising a same most significant bit portion; and
   assigning an m-bit compressed connection identifier (CCID) value to each transport connection, the m-bit CCID value for each transport connection having a fewer number of bits than the CID for that transport connection and comprising a least significant bit portion of the CID for that transport connection a connection identifier, the multi-user packet data structure comprising a multi-user MAC header and one of a multi-user frame check sequence (MFCS) field or a multi-user header check sequence (MHCS) field, the MFCS field to include a cyclic redundancy check (CRC) value calculated for the entire multi-user packet data structure including the multi-user MAC header and the plurality of user data payloads included in the multi-user payload field, the MHCS field to include a CRC value calculated for only the multi-user MAC header.

14. The method of claim 13, further comprising communicating the MU-MAP_IE to the mobile station, the MU-MAP_IE comprising an associated CCID value for the mobile station.

15. The method of claim 13, further comprising communicating the multi-user packet data structure over the transport connection to the mobile station, the multi-user packet data structure including a MAC header structure including an associated CCID value for the mobile station.

16. An article of manufacture comprising a non-transitory computer-readable storage medium storing executable computer program instructions that when executed by a computer cause the computer to perform the method of claim 13.

\* \* \* \* \*